Patented July 31, 1928.

1,679,256

UNITED STATES PATENT OFFICE.

CARL MÜLLER, OF MANNHEIM, WALTER FRANKENBURGER, OF LUDWIGSHAFEN-ON-THE-RHINE, AND FRIEDRICH GRASSNER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PURIFYING ORGANIC LIQUID.

No Drawing. Application filed August 17, 1925, Serial No. 50,850, and in Germany August 30, 1924.

Organic liquids obtained in a synthetic way, especially those prepared from gases containing carbon monoxid or which may have been stored for some time in metallic vessels in the presence of carbon monoxid, are often contaminated with a small amount of iron or other metal carbonyl which can only difficultly be removed by the usual method which however causes much trouble when the liquids are used for or subjected to further treatment, particularly by catalytic methods.

We have now found that metal carbonyls, especially iron carbonyl, dissolved in organic liquids even in small traces, can be completely removed by subjecting the liquid to ultra-violet rays, or treating them with gases containing ozone which for the purpose of our invention are equivalents of ultra-violet rays. By said treatment the metal carbonyls are decomposed, forming non-volatile products which can easily be removed from the liquid either by distillation or by a settling process and filtration or similar mechanical means.

If the liquid is contaminated by impurities such for example as aldehydes, or ketones, such compounds are also destroyed or converted into substances which can be easily removed by the action of ultra-violet rays in the presence of oxygen or by the action of ozone. In such cases a double purification effect is obtained without any addition of substances foreign to the liquid to be purified.

As a source of ultra-violet rays a mercury lamp may be used, the liquid, for example, being passed through a tube surrounding the lamp in order to utilize the active rays in all directions. A complete decomposition of iron carbonyl contained in the liquor is attained in a very short time.

The above process is of special importance for the purification of synthetic methanol or other organic substances containing oxygen, prepared from carbon monoxid under pressure by catalysis, for example higher alcohols, isobutyl alcohol and so on. For example, synthetic methanol containing 2 milligrams of iron in the form of iron carbonyl per litre is exposed to the rays of a mercury lamp until no volatile iron compounds are left. By blowing in oxygen or air at the same time, the impurities of an aldehyde nature are also destroyed. The same effect is also produced by a treatment with gases containing a slight percentage of ozone.

We claim:

1. A process of removing metal carbonyl from organic liquids containing less than about 10 per cent thereof which consists in exposing the liquid to the action of ultra-violet rays.

2. A process for the purification of alcohols synthetically produced from carbon monoxid which consists in exposing same to the action of ultra-violet rays.

3. A process for the purification of alcohols synthetically produced from carbon monoxid which consists in exposing same to the action of ultra-violet rays, simultaneously introducing a gas containing oxygen.

In testimony whereof we have hereunto set our hands.

CARL MÜLLER.
WALTER FRANKENBURGER.
FRIEDRICH GRASSNER.